US010572722B2

(12) United States Patent
Wang et al.

(10) Patent No.: US 10,572,722 B2
(45) Date of Patent: Feb. 25, 2020

(54) DISPLAY APPARATUS AND DISPLAY METHOD

(71) Applicant: BOE TECHNOLOGY GROUP CO., LTD., Beijing (CN)

(72) Inventors: Zifeng Wang, Beijing (CN); Lei Cao, Beijing (CN); Yan Ren, Beijing (CN); She Lin, Beijing (CN); Nannan Hu, Beijing (CN); Hailan Jin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 53 days.

(21) Appl. No.: 15/752,470

(22) PCT Filed: Jul. 20, 2017

(86) PCT No.: PCT/CN2017/093719
§ 371 (c)(1),
(2) Date: Feb. 13, 2018

(87) PCT Pub. No.: WO2018/126642
PCT Pub. Date: Jul. 12, 2018

(65) Prior Publication Data
US 2019/0012529 A1    Jan. 10, 2019

(30) Foreign Application Priority Data
Jan. 4, 2017    (CN) .......................... 2017 1 0003900

(51) Int. Cl.
*G06K 9/00* (2006.01)
*G06K 9/32* (2006.01)
(Continued)

(52) U.S. Cl.
CPC ........... *G06K 9/00342* (2013.01); *A47G 1/02* (2013.01); *G06F 3/14* (2013.01); *G06F 3/147* (2013.01);
(Continued)

(58) Field of Classification Search
CPC ............ G06K 9/00342; G06K 9/3241; G06K 9/00369; G06T 7/194; G06F 3/147;
(Continued)

(56) References Cited

U.S. PATENT DOCUMENTS 8,982,109 B2    3/2015  Vilcovsky et al.
2011/0102320 A1    5/2011  Hauke
(Continued)

FOREIGN PATENT DOCUMENTS

CN    101782900 A    7/2010
CN    101971128 A    2/2011
(Continued)

OTHER PUBLICATIONS

International Seach Report dated Oct. 11, 2017.
First Chinese Office Action dated Aug. 5, 2019.

*Primary Examiner* — Leon Flores
(74) *Attorney, Agent, or Firm* — Dilworth & Barrese, LLP.; Michael J. Musella, Esq.

(57) ABSTRACT

A display apparatus and a display device are provided. The display apparatus includes: a first image acquisition device, configured to acquire a target image of a target region in the case that a human body is in the target region; an image processing device, configured to identify a body physical feature of the human body according to a human body image in the target image; an image generating device, configured to generate, according to the body physical feature, a virtual human body image corresponding to the human body and conforming to a target age; and a display device, configured to display the virtual human body image. A region displaying the virtual human body image is a virtual human body display region.

17 Claims, 8 Drawing Sheets

(51) Int. Cl.
*G09F 19/16* (2006.01)
*G06T 7/194* (2017.01)
*A47G 1/02* (2006.01)
*H04N 5/232* (2006.01)
*H04N 5/247* (2006.01)
*G06F 3/147* (2006.01)
*G06F 3/14* (2006.01)

(52) U.S. Cl.
CPC ............ *G06K 9/3241* (2013.01); *G06T 7/194* (2017.01); *G09F 19/16* (2013.01); *H04N 5/232* (2013.01); *H04N 5/247* (2013.01); *G06K 9/00369* (2013.01)

(58) Field of Classification Search
CPC .......... G06F 3/14; H04N 5/232; H04N 5/247; A47G 1/02
See application file for complete search history.

(56) References Cited

U.S. PATENT DOCUMENTS

| | | | |
|---|---|---|---|
| 2011/0169932 A1 | 7/2011 | Mula et al. | |
| 2013/0222647 A1* | 8/2013 | Ishihara | G06T 15/503 348/239 |
| 2015/0049924 A1 | 2/2015 | Tang et al. | |
| 2015/0212585 A1* | 7/2015 | Latta | G06F 3/005 345/158 |
| 2015/0348326 A1* | 12/2015 | Sanders | G06T 19/006 345/633 |

FOREIGN PATENT DOCUMENTS

| | | |
|---|---|---|
| CN | 103413270 A | 11/2013 |
| CN | 103514545 A | 1/2014 |
| CN | 105210093 A | 12/2015 |
| CN | 105827930 A | 8/2016 |
| CN | 106203304 A | 12/2016 |

* cited by examiner

DISPLAY APPARATUS AND DISPLAY METHOD

TECHNICAL FIELD

Embodiments of the present disclosure relate to a display apparatus and a display method.

BACKGROUND

A traditional display apparatus is used for displaying image information such as photos and videos. People are reminded of their past lives by watching the videos, the photos and the like that are saved, but the saved image information displayed in this way is relatively fixed and cannot be associated with a current real environment, and the user cannot interact with the saved image information displayed on the display apparatus.

SUMMARY

According to the embodiments of the disclosure, a display apparatus is provided. The display apparatus comprises: a first image acquisition device, configured to acquire a target image of a target region in the case that a human body is in the target region; an image processing device, configured to identify a body physical feature of the human body according to a human body image in the target image; an image generating device, configured to generate, according to the body physical feature, a virtual human body image corresponding to the human body and conforming to a target age; and a display device, configured to display the virtual human body image. A region displaying the virtual human body image is a virtual human body display region.

For example, in the display apparatus provided by the embodiments of the disclosure, the image processing device is further configured to identify, according to the target image, a region occupied by the human body image in the target image; the region occupied by the human body image corresponds to a human body corresponding region of the display device; and the virtual human body display region is located in the human body corresponding region.

For example, the human body corresponding region is a rectangular region corresponding to a boundary surrounding the periphery of the human body.

For example, the human body corresponding region is a region corresponding to an outline of the human body.

For example, in the display apparatus provided by the embodiments of the disclosure, the virtual human body display region changes in real time according to change of the human body corresponding region.

For example, the display apparatus provided by the embodiments of the disclosure further comprises a storage device. The first image acquisition device is further configured to acquire a background image of the target region in the case that no human body is in the target region; and the storage device is configured to store the background image.

For example, in the display apparatus provided by the embodiments of the disclosure, the display device is further configured to display a portion of the background image corresponding to a background display region in the background display region, and the background display region is a display region outside the virtual human body display region.

For example, in the display apparatus provided by the embodiments of the disclosure, the display device is a mirror display device, the display device is configured to display a portion of the background image corresponding to a filled display region in the filled display region, and the filled display region is a display region within the human body corresponding region and outside the virtual human body display region.

For example, in the display apparatus provided by the embodiments of the disclosure, the first image acquisition device is a visible-light image acquisition device.

For example, the display apparatus provided by the embodiments of the disclosure further comprises a second image acquisition device. The second image acquisition device is configured to acquire another target image of the target region, and the second image acquisition device is an infrared image acquisition device or a visible-light image acquisition device.

For example, the display apparatus provided by the embodiments of the disclosure further comprises a database device, and the database device is configured to store a plurality of sample data.

For example, the display apparatus provided by the embodiments of the disclosure further comprises a feature analyzing device. The feature analyzing device is configured to identify an estimated age of the human body according to the body physical feature, and the target age is different from the estimated age. The image generating device is configured to: search the sample data closest to the body physical feature in the database device; and generate the virtual human body image corresponding to the human body and conforming to the target age according to the sample data closest to the body physical feature.

For example, the display apparatus provided by the embodiments of the disclosure further comprises a feature analyzing device. The feature analyzing device is configured to identify an estimated age of the human body according to the body physical feature, and the target age is different from the estimated age. The image generating device is configured to: determine an identity information of the human body according to the body physical feature; search at least one of the plurality of sample data conforming to the identity information in the database device; generate a comprehensive sample data according to the at least one of the plurality of sample data conforming to the identity information; and generate the virtual human body image corresponding to the human body and conforming to the target age according to the comprehensive sample data.

For example, in the display apparatus provided by the embodiments of the disclosure, the body physical feature includes an action of the human body, and an action of a virtual human body in the virtual human body image corresponds to the action of the human body.

According to the embodiments of the disclosure, a display method is provided, which is applicable to the display as described above. The method comprises: acquiring a target image of a target region in the case that a human body is in the target region; identifying a body physical feature of the human body according to the target image; generating a virtual human body image corresponding to the human body and conforming to a target age according to the body physical feature; and displaying the virtual human body image in a virtual human body display region.

For example, the display method further comprises: identifying a position of the human body according to the target image. The position of the human body corresponds to a human body corresponding region of a display device, and the virtual human body display region is located in the human body corresponding region.

For example, the display method further comprises: acquiring and storing a background image of the target region in the case that no human body is in the target region; displaying a portion of the background image corresponding to a background display region in the background display region, and the background display region being a display region outside the virtual human body display region.

For example, the display method further comprises: acquiring and storing a background image of the target region in the case that no human body is in the target region; in the case that a display device is a mirror display device, displaying a portion of the background image corresponding to a filled display region in the filled display region, and the filled display region being a display region within the human body corresponding region and outside the virtual human body display region.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

The technical solutions of the embodiments of the present disclosure will be described clearly and completely with reference to the accompanying drawings. Referring to the exemplary embodiments illustrated in the accompanying drawings and detailed in the following description, embodiments of the present disclosure and their various features and advantageous details will be described more fully. It should be noted that the features illustrated in the accompanying drawings are not necessarily to be drawn on scale. The present disclosure has omitted descriptions of well-known materials, assemblies, and process technologies so as not to obscure the exemplary embodiments of the present disclosure. The exemplary embodiments presented here merely intend to facilitate an understanding of the embodiments of the present disclosure and to further enable those skilled in the art to practice the embodiments of the present disclosure. Therefore, these exemplary embodiments should not be construed as limiting the scope of the present disclosure.

Unless otherwise defined, the technical terms or scientific terms here should be of general meaning as understood by those ordinarily skilled in the art. In the descriptions and claims of the present disclosure, expressions such as "first", "second" and the like do not denote any order, quantity, or importance, but rather are used for distinguishing different components. In addition, in the embodiments of the present disclosure, the same or similar reference numbers denote the same or similar components.

For example, a display apparatus provided by the embodiments of the present disclosure displays a virtual human body image corresponding to a user's body physical feature, associates the virtual human body image with a real environment, and implements an interaction with the virtual human body image, which improves the user's experience.

Figure 1:
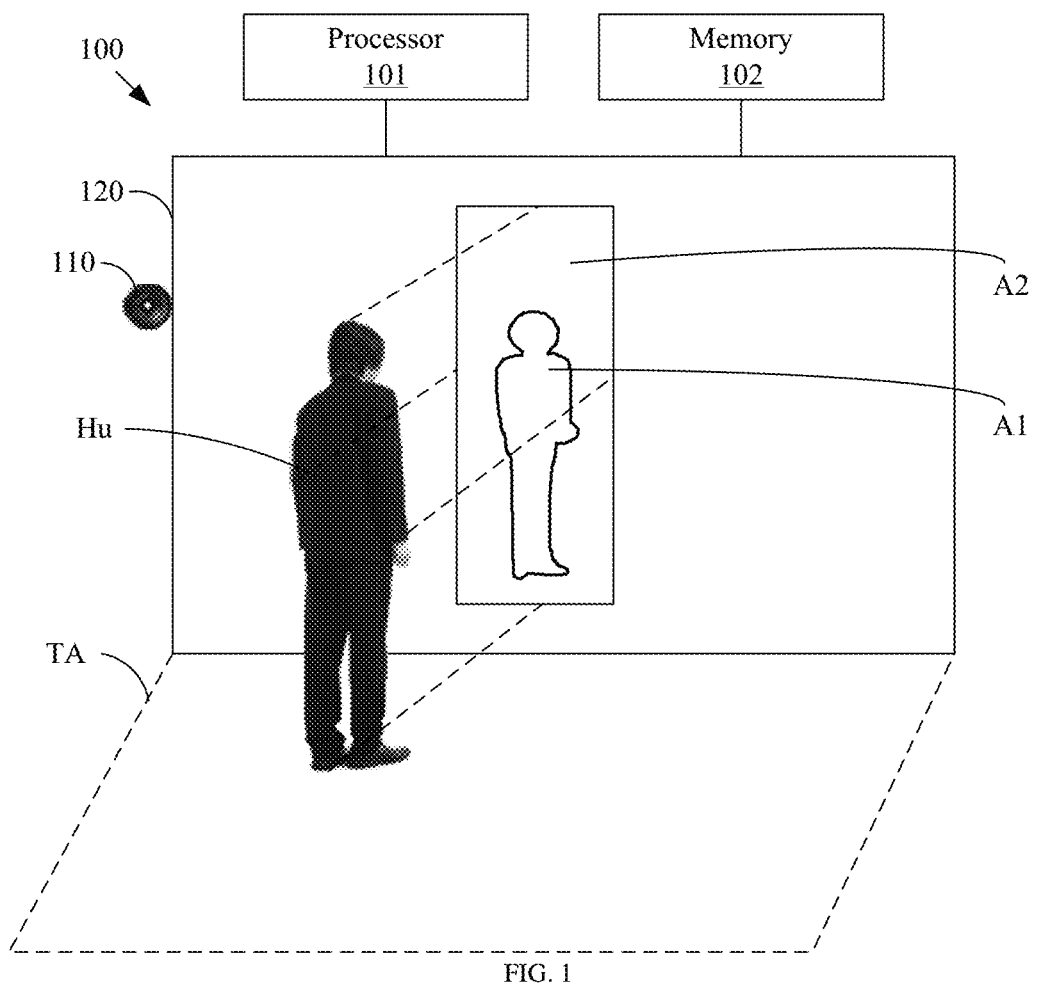
FIG. 1 is a schematic view One of a display apparatus provided by embodiments of the present disclosure.
Figure 2:
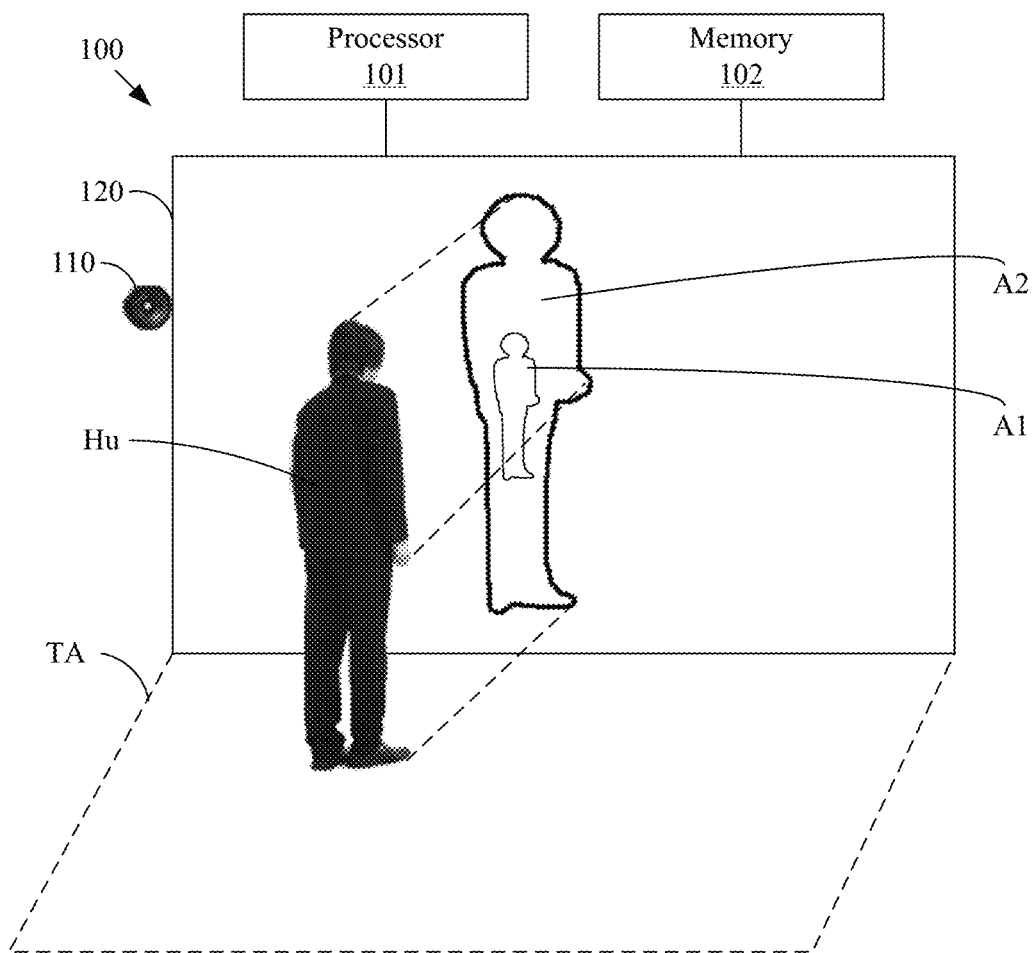
FIG. 2 is a schematic view Two of the display apparatus provided by the embodiments of the present disclosure.
Figure 3:
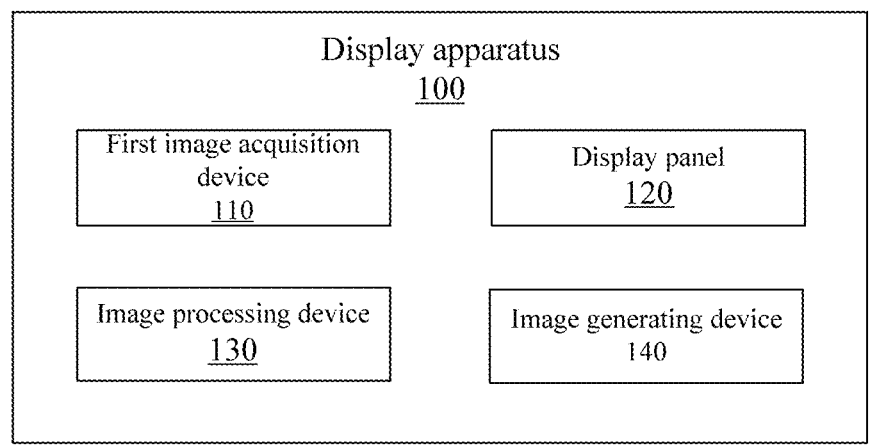
FIG. 3 is a block view One of the display apparatus provided by the embodiments of the present disclosure.

The embodiments of the present disclosure provide the display apparatus 100. As shown in FIG. 1 and FIG. 2, the display apparatus comprises a processor 101, a memory 102, a first image acquisition device 110, and a display panel 120. The display panel 120 is an example of a display device. As shown in FIG. 3, the display apparatus 100 further comprises an image processing device 130 and an image generating device 140. With reference to FIG. 1 to FIG. 3, the first image acquisition device 110 is configured to acquire a target image of a target region TA in a case that a human body Hu is in the target region TA in front of the display panel 120; the image processing device 130 is configured to identify a body physical feature of the human body Hu according to a human body image in the target image; the image generating device 140 is configured to generate, according to the body physical feature, a virtual human body image corresponding to the human body Hu and conforming to a target age; and the display panel 120 is configured to display the virtual human body image, and a region displaying the virtual human body image is a virtual human body display region A1.

For example, respective components in the embodiments of the present disclosure are interconnected with each other through a bus system in a manner of wired connection, wireless connection, or other forms of connection (not shown). It should be noted that components and structures of the display apparatus shown in FIG. 1 to FIG. 3 are merely exemplary but not limitative, and the display apparatus further have other components and structures according to actual requirements.

In the present disclosure, the image acquisition device is, for example, a camera including an image sensor, the image sensor for example is a CMOS image sensor or a CCD image sensor, so that image data in a predetermined region is acquired, and the image data is available for subsequent processing. For example, the image processing device and the Image generating device are Implemented by software, hardware, firmware or any combination thereof; for example, corresponding computer program codes are stored in a storage device, and when these computer program codes are executed by the processor, operation of image processing and image generating are implemented, and the generated image for example is converted into a video signal and transmitted to the display panel to be displayed. For example, the image processing device 130 is an image processing circuit. For example, the image generating device 140 is an image generating circuit.

For example, the storage device is implemented by the memory 102.

For example, the processor 101 is a central processing unit (CPU) or a processing unit with data processing capacity and/or instruction executing capacity in any other form, such as, a digital signal processor (DSP), a field programmable gate array (FPGA), etc., and is used for controlling other components in the display apparatus so as to execute a desired function.

For example, the memory 102 includes one or more computer program product(s), and the computer program product(s) comprise computer readable storage mediums in various forms, for example, a volatile memory and/or non-volatile memory. The volatile memory, for example, comprises a random access memory (RAM) and/or a cache and the like. The nonvolatile memory, for example, comprises a read-only memory (ROM), a hard disk, a flash disk and so on. One or more computer program instruction(s) for example are stored on the computer readable storage medium, and the processor 101 runs the program instruction(s) to implement functions (implemented by the processor) of respective functional devices in the embodiments of the present disclosure and/or other desired function.

For example, the computer program instructions are stored in the memory 102, and in the case that the computer program instructions are run by the processor 101, the processor 101 executes steps of: identifying the body physical feature of the human body according to the acquired target image, and generating the virtual human body image corresponding to the human body and conforming to the target age according to the identified body physical feature.

For example, the target age is input by the user or automatically generated by the display apparatus 100.

For example, the display apparatus 100 further comprises an input device (not shown), and the user inputs the target age and other control information through the input device. The input device for example includes one or more of a keyboard, a mouse, a microphone, and a touch screen, and the like.

For example, in the display apparatus 100 provided by the embodiments of the present disclosure, the image processing device 130 is further configured to identify a region occupied by the human body image in the target image according to the target image, the region occupied by the human body image corresponds to a human body corresponding region A2 on the display panel, as shown in FIG. 1 and FIG. 2, the virtual human body display region A1 is located in the human body corresponding region A2.

For example, as shown in FIG. 1, the human body corresponding region A2 is a rectangular region corresponding to a boundary surrounding the periphery of the human body Hu. For another example, as shown in FIG. 2, the human body corresponding region A2 is a region corresponding to an outline of the human body Hu. For example, a shape of the human body corresponding region A2 includes but is not limited to the cases as described in the embodiments of the present disclosure.

For example, in the display apparatus 100 provided by the embodiments of the present disclosure, the virtual human body display region A1 changes in real time according to change of the human body corresponding region. For example, in the case that the human body Hu moves leftward and rightward with respect to the display panel, the human body corresponding region A2 also changes in real time with the movement of the human body so as to move leftward and rightward, and the virtual human body display region A1 changes in real time with the movement of the human body corresponding region A2 so as to also move leftward and rightward correspondingly. In addition, in the case that the human body Hu moves forward and backward with respect to the display panel, the human body corresponding region A2 changes in real time with the movement of the human body so as to zoom in or zoom out, and the virtual human body display region A1 changes in real time with the movement of the human body corresponding region A2 so as to also zoom in or zoom out correspondingly.

Figure 5:
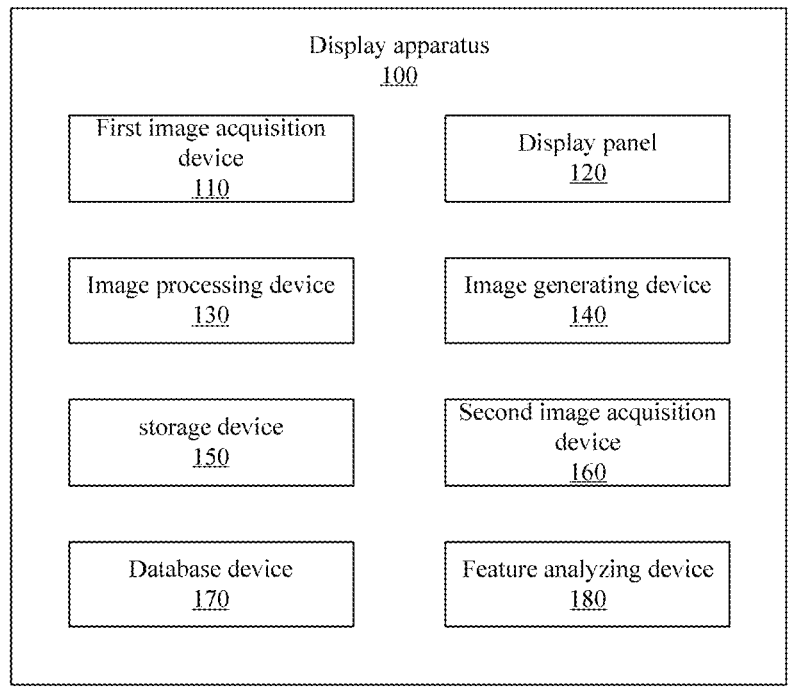
FIG. 5 is a block view Two of the display apparatus provided by the embodiments of the present disclosure.
Figure 6:
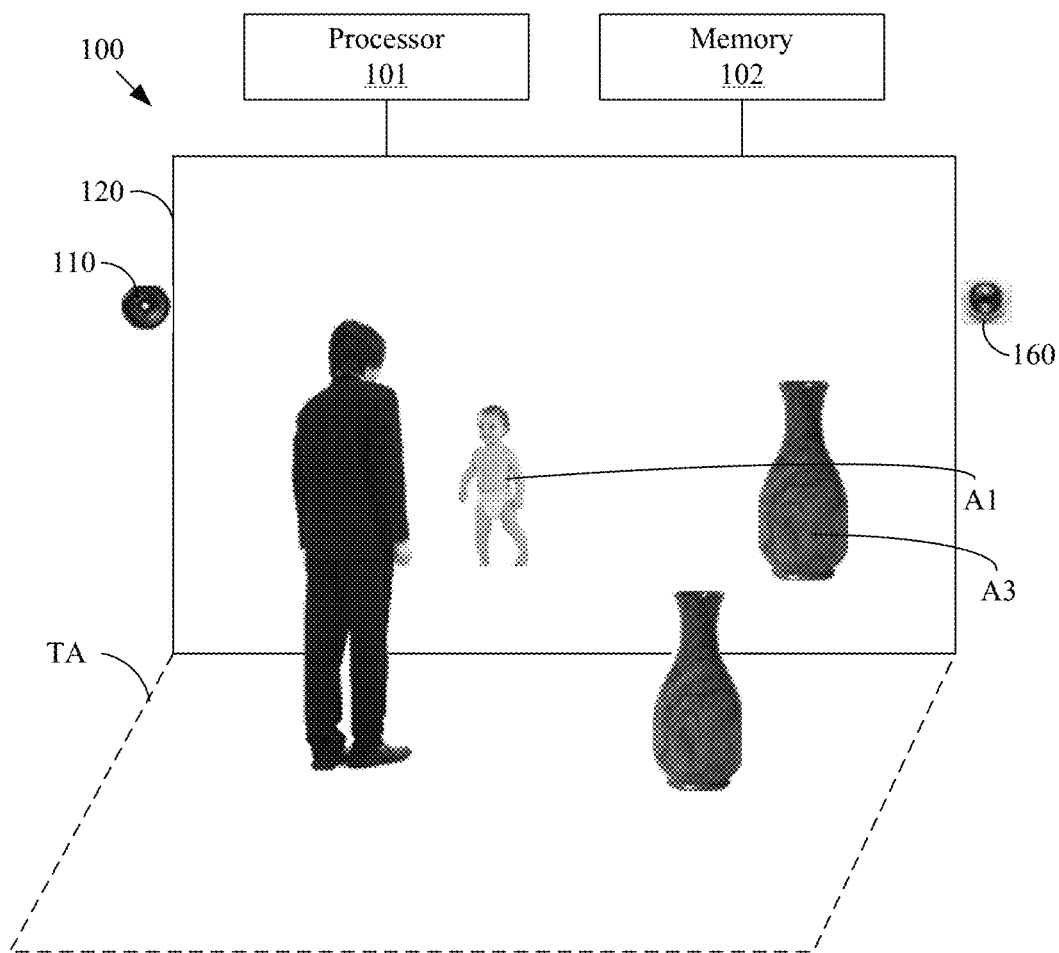
FIG. 6 is a schematic view Four of the display apparatus provided by the embodiments of the present disclosure.

For example, as shown in FIG. 5 and FIG. 6, the display apparatus 100 provided by the embodiments of the present disclosure further comprises a storage device 150. The first image acquisition device 110 is further configured to acquire a background image A3 of the target region TA in the case that no human body is in the target region TA; and the storage device 150 is configured to store the background image A3.

It should be noted that, in FIG. 6, the background image A3 is exemplarily illustrated by taking a vase as an example; the background image A3 includes but is not limited to an image only corresponding to a position where the vase is located in FIG. 6, and changes according to an environment in which the display apparatus is applied; and for example, the background image A3 includes a tree, a building, and the like. For example, the background image A3 is an image of an entirety of the target region TA in the case that no human body is in the target region TA.

For example, as shown in FIG. 6, in the display apparatus 100 provided by the embodiments of the present disclosure, the display panel 120 is further configured to display a portion of the background image corresponding to a background display region in the background display region, and the background display region for example is a display region outside the virtual human body display region A1. That is to say, as shown in FIG. 6, the display panel 120 displays the virtual human body image in the virtual human body display region A1, and at a same time, displays the background image A3 in the background display region outside the virtual human body display region A1. That is to say, the portion of the background image A3 corresponding to the background display region is displayed in the background display region outside the virtual human body display region A1. For example, the background image A3 is compared with the target image with the human body, and a same portion of the background image A3 and the target image with the human body is just the portion of the background image A3 displayed outside the virtual human body display region A1. In this way, the user experiences that the virtual human body image and himself/herself are in the same environment, which enhances authenticity of the display and improves the user's experience.

It should be noted that, the image displayed by the display apparatus 100 in FIG. 6 is merely an example in the embodiments of the present disclosure, the virtual human body image in the virtual human body display region A1 for example is an image of the human body in a childhood age, or an image of the human body in other age range (for example, an old age), or is other processed virtual human body images. For example, the age of the virtual human body image in the virtual human body display region A1 is determined according to the target age.

For example, in the display apparatus 100 provided by the embodiments of the present disclosure, the display panel 120 is a mirror display panel 120. For example, the mirror display panel is implemented with an advanced polarizer film (APF); and for example, the APF is attached with a polarizer, and then attached to the display panel, so as to implement mirror display. A region of the mirror display panel 120 to which a display data is not applied appears as a mirror surface, so as to present an image of an object appearing in front of it as a mirror, and a region of the mirror display panel 12 to which the display data is applied displays the image corresponding to the display data.

For example, in the case that the display panel 120 is the mirror display panel, it is not necessary to display the background image outside the human body corresponding region A2, that is, the mirror display is implemented outside the human body corresponding region A2, so as to make the background image more realistic, reflect a change of the background image in real time, and enhance the user's experience. However, in order to prevent the user from seeing his/her own image in a filled display region in the display panel 120 (for example, the filled display region is a display region within the human body corresponding region A2 and outside the virtual human body display region A1), it is further necessary to configure the display panel 120 to display a portion of the background image corresponding to the filled display region in the filled display region. For example, the background image A3 is compared with the target image with the human body, a region corresponding to a different portion between the background image A3 and the target image with the human body is just the human body corresponding region A2. The virtual human body display region A1 is selected and removed from the human body corresponding region A2, so as to obtain the filled display region. That is to say, in the case that the display panel 120 is the mirror display panel, the displayed image is composed of three portions, a first portion is the virtual human body image in the virtual human body display region A1, a second portion is the background image displayed in the filled region outside the virtual human body display region A1 and within the human body corresponding region A2, and a third portion is a mirror image outside the human body corresponding region A2.

For example, in the display apparatus 100 provided by the embodiments of the present disclosure, the first image acquisition device 110 is a visible-light image acquisition device. For example, the target image is a visible-light image, and the image processing device 130 identifies the body physical feature of the human body through the visible-light target image.

For example, the body physical feature of the human body includes facial feature, outline, hair color, skin color and clothing. It should be noted that, the body physical feature of the human body includes but is not limited to the above-described features, and may further includes other features that reflect the human body.

For example, the facial feature of the human body is zoomed out or zoomed in to form the facial feature of the virtual human body image.

Figure 4:
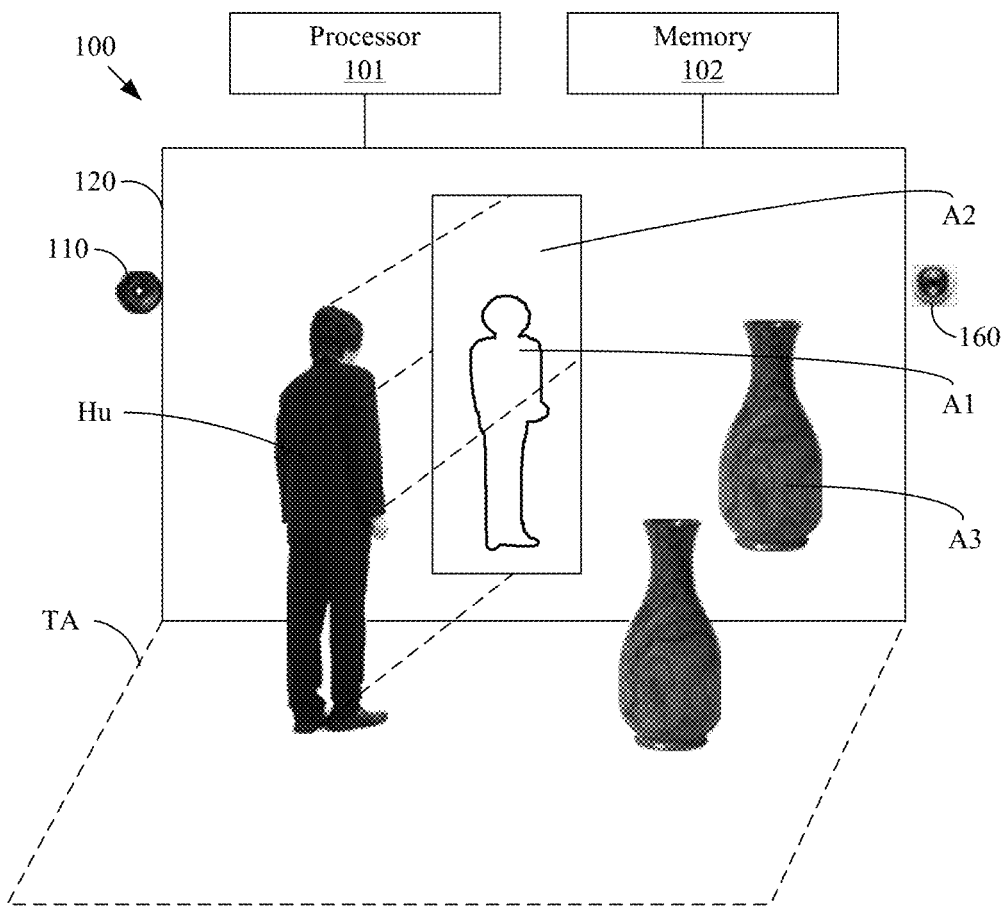
FIG. 4 is a schematic view Three of the display apparatus provided by the embodiments of the present disclosure.

For example, as shown in FIG. 4 and FIG. 6, the display apparatus 100 provided by the embodiments of the present disclosure further comprise a second Image acquisition device 160. The second image acquisition device 160 is configured to acquire another target image of the target region TA, and the second image acquisition device 160 for example is an infrared Image acquisition device or the visible-light image acquisition device. For example, the second image acquisition device is a camera including an image sensor, the image sensor for example is a CMOS image sensor or a CCD image sensor.

For example, in the case that the second image acquisition device 160 is the infrared image acquisition device, an identification rate of the human body is improved because the infrared image acquisition device is more sensitive to temperature of the human body.

For example, in the case that the second image acquisition device 160 is the visible-light image acquisition device, the target image or the background image acquired by the first image acquisition device 110 is subjected to image fusion processing with the target image or the background image acquired by the second image acquisition device 160, so as to improve the identification rate of the human body, and at a same time, reduce an block region of the human body.

Figure 7:
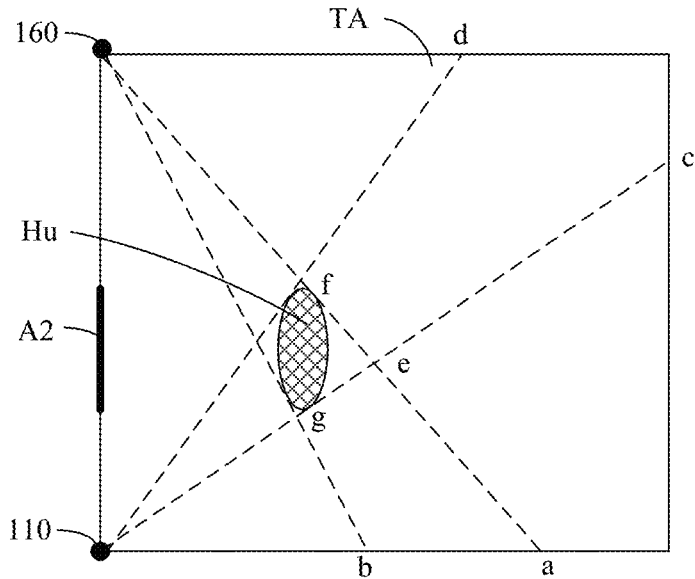
FIG. 7 is a schematic view of a human body block region in the embodiments of the present disclosure.

For example, the block region of the human body Hu is shown in FIG. 7, an block region for the image acquired by the first image acquisition device 110 is a region between the human body Hu and d, c, and an block region for the image acquired by the second image acquisition device 160 is a region between the human body Hu and a, b. In the case that the display panel 120 is not the mirror display panel, change of the background image located in the block region is not able to be acquired in real time, so that the change of the background image located in the block region is impossible to be updated and displayed on the display panel 120, which affects the user's experience. By providing the first image acquisition device 110 and the second image acquisition device 160, it is possible to greatly reduce an area of the block region, and in this case, the block region is a region surrounded by e, f, g and the human body Hu in FIG. 7.

For example, positions at which the first image acquisition device 110 and the second image acquisition device 160 are provided are not limited to a left side and a right side of the display panel 120 as shown in FIG. 4 and FIG. 6. The first image acquisition device 110 and the second image acquisition device 160 may be provided at other positions, for example, provided on an upper side and a lower side of the display panel 120.

For example, the number of the image acquisition devices is not limited to two, but a plurality of image acquisition devices may be provided at a same time, for example, 3, 4 or 5, and the like; the plurality of image acquisition devices for example are provided in the periphery of the display panel 120, so as to reduce the area of the block region as far as possible and improve the identification rate of the human body.

For example, the target region TA in the embodiments of the present disclosure corresponds to view fields of respective image acquisition devices. That is to say, each of the image acquisition devices is capable of acquiring the image of the target region TA.

For example, as shown in FIG. 5, the display apparatus 100 provided by the embodiments of the present disclosure further comprises a database device 170, configured to store a plurality of sample data.

For example, the sample data includes image data such as photographs, videos and the like of different age ranges of a plurality of human bodies, and also includes information such as education degree, occupation, birth place and the like of the human bodies.

For example, the database device 170 is provided in the display apparatus 100, or is provided in a server of a local area network or a wide area network, or is provided in a cloud server; the server for example is connected with the display apparatus through a wired or wireless network. For example, the database device 170 is further configured to search and acquire the sample data of the human bodies from the Internet.

For example, as shown in FIG. 5, the display apparatus 100 provided by the embodiments of the present disclosure further comprise a feature analyzing device 180, configured to identify an estimated age of the human body according to the body physical feature, and the target age for example is different from the estimated age. That is to say, the age of the virtual human body image for example is different from the estimated age of the human body. In this way, the user sees himself/herself at an age different from his/her age in reality in the virtual human body image displayed on the display apparatus 100, so as to enhance interest and improve the user's experience.

For example, the estimated age of the human body is identified according to body physical features such as facial wrinkles, hair color and the like of the human body.

In this case, for example, that the image generating device is configured to generate the virtual human body image corresponding to the human body and conforming to the target age of according to the body physical feature, includes: searching the sample data closest to the body physical feature in the database device 170; and generating the virtual human body image corresponding to the human body and conforming to the target age according to the sample data closest to the body physical feature.

For another example, that the image generating device is configured to generate the virtual human body image corresponding to the human body and conforming to the target age according to the body physical feature, includes: determining an identity information of the human body according to the body physical feature; searching at least one of the plurality of sample data conforming to the identity information in the database device 170; generating a comprehensive sample data according to the at least one of the plurality of sample data conforming to the identity information; and generating the virtual human body image corresponding to the human body and conforming to the target age according to the comprehensive sample data.

For example, the identity information of the human body is determined according to clothing, jewelry, skin color, facial expression and the like of the human body; and the identity information of the human body includes, for example, education degree, occupation, birth place, race, and the like.

For example, in the display apparatus 100 provided by the embodiments of the present disclosure, the body physical feature includes an action of the human body, and an action of the virtual human body in the virtual human body image corresponds to the action of the human body. That is to say, in the case that the action of the human body changes, for example, in the case that the human body waves hands, the virtual human body also performs the action of waving hands, which enhances authenticity and interest of display and improves the user's experience.

In the embodiments of the disclosure, the database device and the feature analyzing device for example are implemented by software, hardware, firmware or any combination thereof; for example, corresponding computer program codes, data required for running the computer program codes and data generated by running the computer program codes are stored in the storage device, which Implement corresponding database function and feature analysis function upon being executed by a same processor or different processors. For example, the database device 170 is a database circuit. For example, the feature analyzing device 180 is a feature analyzing circuit.

Figure 8:
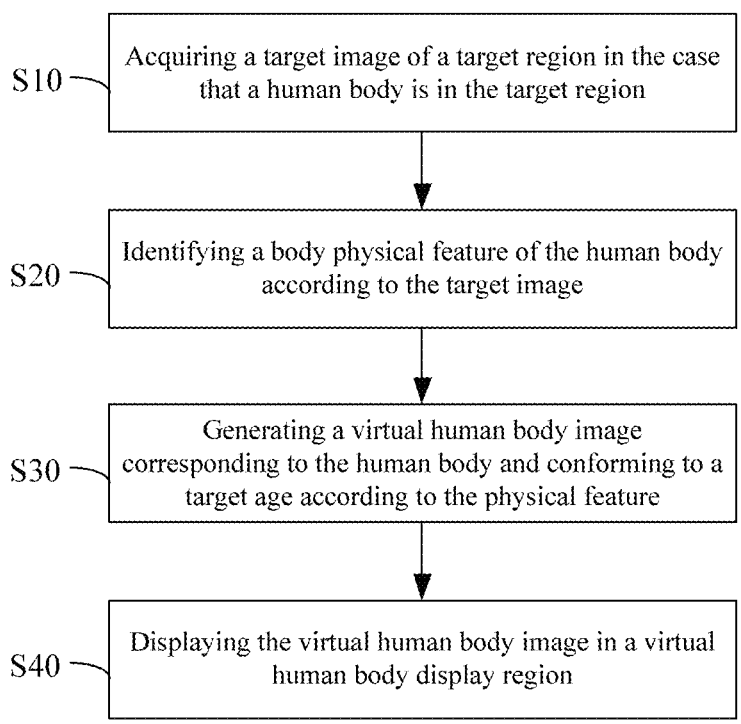
FIG. 8 is a flow chart One of a display method provided by the embodiments of the present disclosure.

For example, as shown in FIG. 8, the embodiments of the present disclosure further provide a display method, and the display method comprises steps of:

Step S10: acquiring a target image of a target region in the case that a human body is in the target region;

Step S20: identifying a body physical feature of the human body according to the target image;

Step S30: generating a virtual human body image corresponding to the human body and conforming to a target age according to the body physical feature;

Step S40: displaying the virtual human body image in a virtual human body display region.

Figure 9:
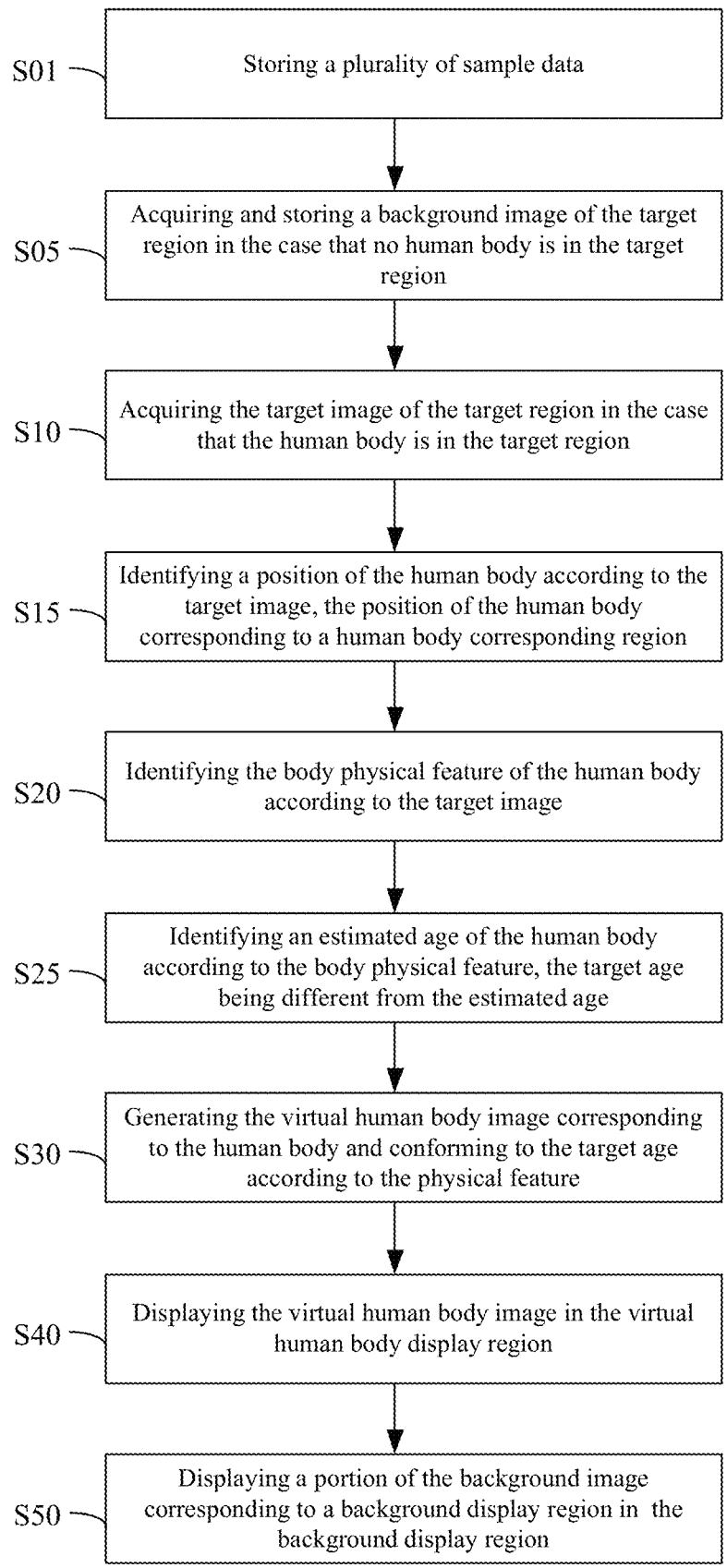
FIG. 9 is a flow chart Two of the display method provided by the embodiments of the present disclosure.
Figure 10:
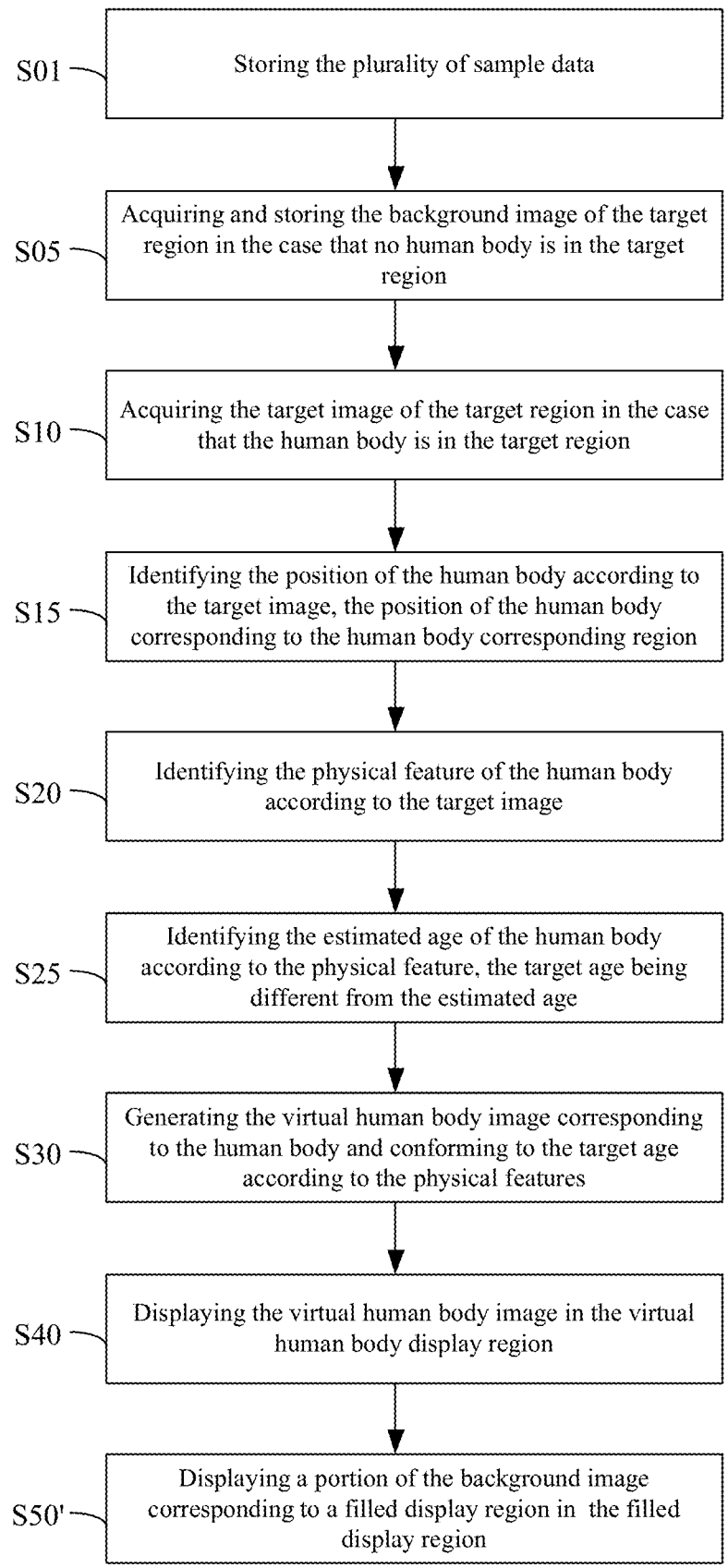
FIG. 10 is a flow chart Three of the display method provided by the embodiments of the present disclosure.

For example, as shown in FIG. 9 and FIG. 10, the display method provided by the embodiments of the present disclosure, further comprises steps of:

Step S15: identifying a position of the human body according to the target image, the position of the human body corresponding to a human body corresponding region, and the virtual human body display region being located in the human body corresponding region.

For example, the virtual human body display region changes in real time according to change of the human body corresponding region.

For example, as shown in FIG. 9 and FIG. 10, the display method provided by the embodiments of the present disclosure, further comprises steps of:

Step S05: acquiring and storing a background image of the target region in the case that no human body is in the target region.

For example, as shown in FIG. 9, the display method provided by the embodiments of the present disclosure, further comprises steps of:

Step S50: displaying a portion of the background image corresponding to a background display region in the background display region, the background display region being a display region outside the virtual human body display region.

For example, as shown in FIG. 10, in the case that the display panel is a mirror display panel, in the display method provided by the embodiments of the present disclosure, step S50 is replaced by step S50'.

Step S50': displaying a portion of the background image corresponding to a filled display region in the filled display region, the filled display region being a display region within the human body corresponding region and outside the virtual human body display region.

For example, as shown in FIG. 9 and FIG. 10, the display method provided by the embodiments of the present disclosure, further comprises steps of:

Step S01: storing a plurality of sample data.

For example, as shown in FIG. 9 and FIG. 10, the display method provided by the embodiments of the present disclosure, further comprises steps of:

Step S25: identifying an estimated age of the human body according to the body physical feature, the target age being different from the estimated age.

Figure 11:
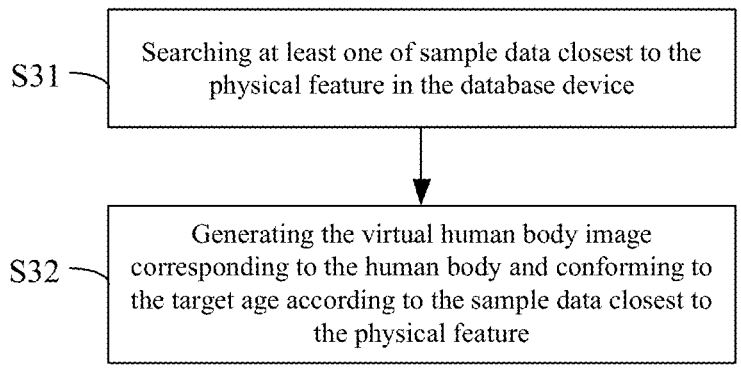
FIG. 11 is a flow chart One of implementing step S30 in the display method provided by the embodiments of the present disclosure.

For example, as shown in FIG. 11, in the display method provided by the embodiments of the present disclosure, the generating the virtual human body image corresponding to the human body and conforming to the target age according to the body physical feature (step S30) includes:

Step S31: searching the sample data closest to the body physical feature in a database device; and Step S32: generating the virtual human body image corresponding to the human body and conforming to the target age according to the sample data closest to the body physical feature.

Figure 12:
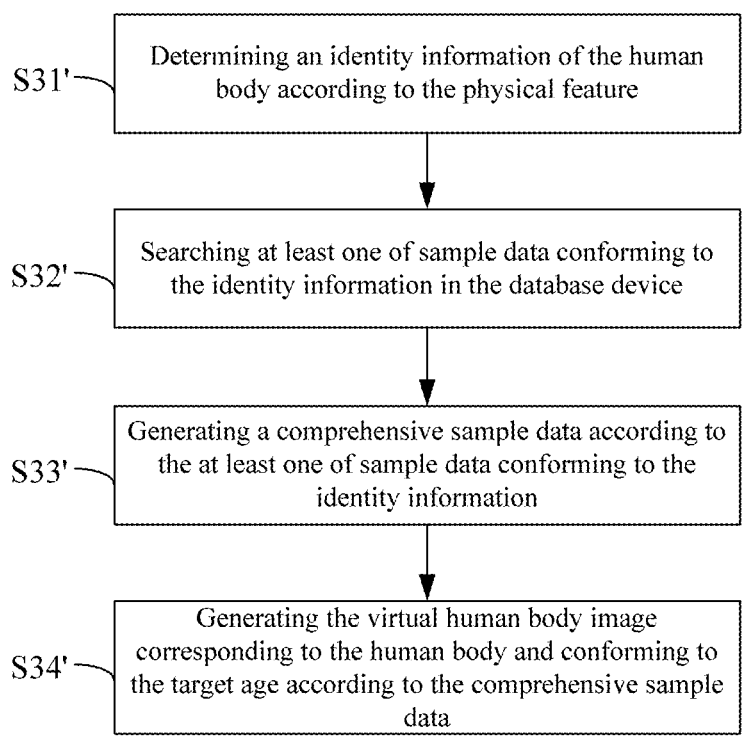
FIG. 12 is a flow chart Two of implementing step S30 in the display method provided by the embodiments of the present disclosure.

For example, as shown in FIG. 12, in the display method provided by the embodiments of the present disclosure, the generating the virtual human body image corresponding to the human body and conforming to the target age according to the body physical feature includes:

Step S31': determining an identity information of the human body according to the body physical feature;

Step S32': searching at least one of the plurality of sample data conforming to the identity information in the database device;

Step S33': generating a comprehensive sample data according to the at least one of the plurality of sample data conforming to the identity information; and Step S34': generating the virtual human body image corresponding to the human body and conforming to the target age according to the comprehensive sample data.

For example, in the display method provided by the embodiments of the present disclosure, the body physical feature includes an action of the human body, and an action of the virtual human body in the virtual human body image corresponds to the action of the human body.

For example, a working mode of the display apparatus will be described in conjunction with FIG. 9 and FIG. 10. The database device is configured to store the plurality of sample data to implement step S01. The first image acquisition device is configured to acquire and store the background image of the target region in the case that no human body is in the target region, to implement step S05. The first image acquisition device is further configured to acquire the target image of the target region in the case that the human body is in the target region to implement step S10.

In the embodiments of the present disclosure, the memory has the computer program instructions stored thereon, and in the case that the computer program instructions are executed by the processor, the above-described steps S15, S20, S25 and S30 are performed as follows: identifying the position of the human body according to the target image, and the position of the human body corresponding to the human body corresponding region; identifying the body physical feature of the human body according to the target image; identifying the estimated age of the human body according to the body physical feature, the target age being different from the estimated age; and generating the virtual human body image corresponding to the human body and conforming to the target age according to the body physical feature. The display panel is configured to display the virtual human body image in the virtual human body display region, to implement step S40.

The display panel is further configured to display the portion of the background image corresponding to the background display region in the background display region, the background display region being the display region outside the virtual human body display region, to implement step S50; or, the display panel is further configured to display a portion of the background image corresponding to the filled display region in the filled display region, the filled display region being the display region within the human body corresponding region and outside the virtual human body display region, to implement step S50'.

For example, in step S30, the memory has the computer program instructions stored thereon, and in the case that the computer program instructions are executed by the processor, the above-described steps S31, S32 or steps S31', S32', S33' and S34' are implemented.

For example, the display apparatus provided by the embodiments of the present disclosure displays the virtual human body image corresponding to the body physical feature of the user, associates the virtual human body image with the real environment, and implements the interaction with the virtual human body image, which improves the user's experience.

For example, the display apparatus provided by the embodiments of the present disclosure is applied to places such as shopping malls, churches, exhibition halls, and the like.

Although the present disclosure is described in detail hereinbefore with general illustration and specific embodiments, based on the embodiments of the present disclosure, certain amendments or improvements can be made thereto, which are obvious for those skilled in the art. Therefore, all such changes and improvements without departing from the spirit of the present disclosure are within the scope of the claims of the present disclosure.

The present application claims priority of Chinese Patent Application No. 201710003900.5 filed on Jan. 4, 2017, the disclosure of which is incorporated herein by reference in its entirety as part of the present application.

The invention claimed is:

1. A display apparatus, comprising:
a first image acquisition device, configured to acquire a target image of a target region if a human body is in the target region;
an image processing device, configured to identify a body physical feature of the human body according to a human body image in the target image;
an image generating device, configured to generate, according to the body physical feature, a virtual human body image corresponding to the human body and conforming to a target age; and
a display device, configured to display the virtual human body image, wherein
a region, displaying the virtual human body image, of the display device is a virtual human body display region;
the first image acquisition device is further configured to acquire a background image of the target region if no human body is in the target region;
the image processing device is further configured to identify, according to the target image, a region occupied by the human body image in the target image; the region occupied by the human body image corresponds to a human body corresponding region of the display device; and the virtual human body display region is located in the human body corresponding region; and
the display device is a mirror display device, the display device is configured to display a portion of the background image corresponding to a filled display region in the filled display region, and the filled display region is a display region within the human body corresponding region and outside the virtual human body display region.

2. The display apparatus according to claim 1, wherein the virtual human body display region changes in real time according to change of the human body corresponding region.

3. The display apparatus according to claim 1, further comprising a storage device, wherein
the storage device is configured to store the background image.

4. The display apparatus according to claim 1, wherein a mirror display is implemented outside the human body corresponding region.

5. The display apparatus of claim 1, wherein the first image acquisition device is a visible-light image acquisition device.

6. The display apparatus of claim 1, further comprising a second image acquisition device,
wherein the second image acquisition device is configured to acquire another target image of the target region, and the second image acquisition device is an infrared image acquisition device or a visible-light image acquisition device.

7. The display apparatus of claim 1, further comprising a database device, wherein the database device is configured to store a plurality of sample data.

8. The display apparatus according to claim 7, further comprising a feature analyzing device, wherein
the feature analyzing device is configured to identify an estimated age of the human body according to the body physical feature, and the target age is different from the estimated age; and
the image generating device is configured to:
search the sample data closest to the body physical feature in the database device; and
generate the virtual human body image corresponding to the human body and conforming to the target age according to the sample data closest to the body physical feature.

9. The display apparatus according to claim 7, further comprising a feature analyzing device, wherein
the feature analyzing device is configured to identify an estimated age of the human body according to the body physical feature, and the target age is different from the estimated age; and
the image generating device is configured to:
determine an identity information of the human body according to the body physical feature;
search at least one of the plurality of sample data conforming to the identity information in the database device;
generate a comprehensive sample data according to the at least one of the plurality of sample data sample data conforming to the identity information; and
generate the virtual human body image corresponding to the human body and conforming to the target age according to the comprehensive sample data.

10. The display apparatus of claim 1, wherein the body physical feature comprises an action of the human body, and an action of a virtual human body in the virtual human body image corresponds to the action of the human body.

11. The display apparatus according to claim 1, wherein the human body corresponding region is a rectangular region corresponding to a boundary surrounding the periphery of the human body.

12. The display apparatus according to claim 1, wherein the human body corresponding region is a region corresponding to an outline of the human body.

13. A display method, comprising:
acquiring a target image of a target region if a human body is in the target region;
identifying a body physical feature of the human body according to the target image;
generating a virtual human body image corresponding to the human body and conforming to a target age according to the body physical feature; and
displaying the virtual human body image in a virtual human body display region, wherein
the display method further comprises identifying a position of the human body according to the target image, the position of the human body corresponds to a human body corresponding region of a display device, and the virtual human body display region is located in the human body corresponding region;
the display method further comprises: acquiring and storing a background image of the target region if no human body is in the target region; and if the display device is a mirror display device, displaying a portion of the background image corresponding to a filled display region in the filled display region and the filled display region being a display region within the human body corresponding region and outside the virtual human body display region.

14. The display method according to claim 13, further comprising:
implementing a mirror display outside the human body corresponding region.

15. The display method according to claim 13, wherein the human body corresponding region is a rectangular region corresponding to a boundary surrounding the periphery of the human body.

16. The display method according to claim 13, wherein the human body corresponding region is a region corresponding to an outline of the human body.

17. A display apparatus, comprising:
a first image acquisition device, configured to acquire a target image of a target region if a human body is in the target region;
an image processing device, configured to identify a body physical feature of the human body according to a human body image in the target image;
an image generating device, configured to generate, according to the body physical feature, a virtual human body image corresponding to the human body and conforming to a target age; and
a display device, configured to display the virtual human body image, wherein
a region, displaying the virtual human body image, of the display device is a virtual human body display region;
the display apparatus further comprises a database device, and the database device is configured to store a plurality of sample data;
the display apparatus further comprises a feature analyzing device, the feature analyzing device is configured to identify an estimated age of the human body according to the body physical feature, and the target age is different from the estimated age;
the image generating device is configured to: search the sample data closest to the body physical feature in the database device and generate the virtual human body image corresponding to the human body and conforming to the target age according to the sample data closest to the body physical feature; or, the image generating device is configured to: determine an identity information of the human body according to the body physical feature, search at least one of the plurality of sample data conforming to the identity information in the database device, generate a comprehensive sample data according to the at least one of the plurality of sample data sample data conforming to the identity information, and generate the virtual human body image corresponding to the human body and conforming to the target age according to the comprehensive sample data.

* * * * *